United States Patent [19]

Ikumi et al.

[11] Patent Number: 5,588,854
[45] Date of Patent: Dec. 31, 1996

[54] ELECTRICAL CONNECTION DEVICE BETWEEN HANDLE AND STEERING COLUMN

[75] Inventors: Tohru Ikumi; Nobuhiko Suzuki; Satoshi Ishikawa, all of Shizuoka-ken, Japan

[73] Assignee: Yazaki Corporation, Tokyo, Japan

[21] Appl. No.: 517,623

[22] Filed: Aug. 22, 1995

[30]   Foreign Application Priority Data

Aug. 26, 1994   [JP]   Japan ..................................... 6-202250

[51] Int. Cl.⁶ ........................................................ H01R 3/00
[52] U.S. Cl. ............................................................ 439/164
[58] Field of Search ................................. 439/164, 15, 13

[56]   References Cited

U.S. PATENT DOCUMENTS

| | | | |
|---|---|---|---|
| 5,242,309 | 9/1993 | Hasegawa | 439/164 |
| 5,259,775 | 11/1993 | Kubota et al. | 439/164 |
| 5,286,219 | 2/1994 | Ueno et al. | 439/164 |
| 5,314,344 | 5/1994 | Ida et al. | 439/164 |

FOREIGN PATENT DOCUMENTS

| | | | |
|---|---|---|---|
| 4419075A1 | 1/1994 | Germany | 439/164 |
| 3-44888 | 4/1991 | Japan . | |

*Primary Examiner*—Neil Abrams
*Assistant Examiner*—Eugene G. Byrd
*Attorney, Agent, or Firm*—Finnegan, Henderson, Farabow, Garrett & Dunner, L.L.P.

[57]   ABSTRACT

An electrical connection device between a handle and a steering column for a vehicle includes a rotor, a housing for rotatably supporting the rotor and a flexible flat cable accommodated in an annular space defined by the rotor and the housing. The rotor has a tip having a convex curved-face, which is arranged at an axial end of the rotor. A part of the housing, which comes into contact with the tip of the rotor, is shaped to have a concave curved-face. With the arrangement, when the rotating direction of the rotor is reversed, the tip of the rotor would be guided by the concave curved-face of the housing, so that a plane-contact between the side of the rotor and the side of the housing can be avoided thereby to reduce the contact-noise.

6 Claims, 5 Drawing Sheets

//5,588,854//

ELECTRICAL CONNECTION DEVICE BETWEEN HANDLE AND STEERING COLUMN

BACKGROUND OF THE INVENTION

The present invention relates to an electrical connection device between a handle and a steering column in a steering apparatus for a vehicle.

Recently, in connection with a progress of electronic control for an automobile, various kinds of switches have been provided in the handle, which may be called "a steering wheel", in the steering apparatus for the automobile. Accordingly, there is a need for connecting these switches with electric cables on the steering column side by means of wiring. Since the handle for the vehicle is constructed so as to rotate in both the clockwise and counter-clockwise directions with several revolutions, a flexible flat cable (FFC) having a plurality of lead wires is generally used in an electrical connection device between the handle and the steering column. In the electrical connection device, the flexible flat cable is arranged between a rotor fixed to a handle axle and a housing fixed to the steering column, in either spiral wound condition or a "reversed" spiral wound condition such that the cable is turned up on the half way.

Generally, the electrical connection device includes a cylindrical rotor to which a handle axle of the automobile is fixed and a housing which is fixed to the steering column to rotatably support the rotor at an outside portion thereof. The rotor consists of a first rotor element and a second rotor element to be assembled into the first rotor element from its axial direction. On the other hand, the housing consists of an upper cover and an undercover, both of which define an annular space for accommodating the above-mentioned FFC.

In the assembled state, an axial upper end of the first rotor element is brought into contact with the inner surface of the upper cover. The first rotor element is provided at the axial upper end with a projection projecting toward the inner surface of the upper cover. Opposing the projection, the upper cover is provided with two parallel projections projecting toward the first rotor element, which define a groove therebetween. In assembly, the projection of the first rotor element is engaged into the groove, so that a displacement of the first rotor element in the radial direction can be reduced with respect to the upper cover.

On the other hand, the second rotor element is provided with a flange which extends radially outward of the second rotor element. The flange has a projection formed at its tip to come into contact with the bottom surface of the undercover, so that the second rotor element is engaged with undercover.

In the above-mentioned electrical connection device, in order to facilitate the assembling operation, the projection of the first rotor element is adapted so as to engage into the groove by enough clearance and furthermore, a clearance is also formed between the outer periphery of the second rotor element and the inner periphery of the undercover.

Therefore, when the first and second rotor elements rotate together with an operation of the handle and particularly, when the rotating direction of the rotor is reversed, the rotor would be subject to a force for urging it to move radially with respect to the housing. Consequently, the projection of the first rotor element is brought into contact with respective side surfaces of the projections by planes and similarly, the outer periphery of the second rotor element is also brought into contact with the inner periphery of the undercover by plane, so that the contact-noise is produced thereby to reduce the reliability of the device.

In order to restrict an occurrence of the contact-noise, there may be proposed an electrical connection device in which the first and second rotor elements are urged to the upper cover and the undercover, respectively, by an urging means such as springs. In this case, however, a level of sliding-noise caused by the rotor's rotation on the housing would be increased because the pressure between the rotor and the housing is increased, so that the above problem would still remain.

SUMMARY OF THE INVENTION

It is therefore an object of the present invention to provide an electrical connection device by which the occurrence of noise due to the clearance between the rotor and the housing can be restricted without increasing the sliding-noise caused by the rotation of the rotor.

The object of the invention described above can be accomplished by an electrical connection device between a handle and a steering column for a vehicle, the device comprising:

a rotor into which an axle of the handle is fixed, a housing arranged about the rotor and fixed to the steering column to rotatably support the rotor, the housing defining an annular space therein together with the rotor, and a flexible flat cable accommodated in the annular space to move following both of rotations of the rotor in reverse-directions, the flexible flat cable having one end connected to the housing and another end connected to the rotor thereby to connect the housing with the rotor electrically, wherein the rotor has an axial end of which tip is formed so as to have a convex curved-face, wherein the housing has a part which comes into contact with the tip of said rotor and which is formed to have a concave curved-face.

With the arrangement mentioned above, even if the rotating direction of the rotor is reversed so that it is displaced radially with respect to the housing, the tip of the axial end is guided by the concave curved-face of the housing to slide thereon, whereby a plane-contact of a side surface of the rotor with a side surface of the housing can be avoided.

In the present invention, preferably, the rotor consists of a first rotor element to which the another end of the flat cable is connected, and a second rotor element which is engaged into the first rotor element from axial outside of said housing so that an axial end of the second rotor element is exposed outside of the housing.

More preferably, on the opposite side of the exposed axial end of the second rotor element, said first rotor element has an axial end which is opposed to an interior wall of the housing and which has a tip formed to have a convex curved-face and the interior wall of the housing is formed to have a concave curved-face.

Alternatively, it is preferable that the exposed axial end of the second rotor element is provided with an extension which extends outwardly in the radial direction of the second rotor element and which has a projection projecting toward the housing. In this case, a tip of the projection is shaped to have a convex curved-face while a part of the housing, which comes into contact with the projection, is formed to have a concave curved-face.

More preferably, on the opposite side of the exposed axial end of the second rotor element, the first rotor element is provided with an axial end which is opposed to an interior wall of the housing and which has a tip formed to have a convex curved-face and the interior wall of the housing is formed to have a concave curved-face.

The object of the invention described above can be also accomplished by an electrical connection device between a handle and a steering column for a vehicle, the device comprising:

a rotor into which an axle of the handle is fixed, a housing arranged about the rotor and fixed to the steering column to rotatably support the rotor, the housing defining an annular space therein together with the rotor, and a flexible flat cable accommodated in the annular space to move following both of rotations of the rotor in reverse-directions, the flexible flat cable, having one end connected to the housing and another end connected to the rotor thereby to connect the housing with the rotor electrically, wherein an outer periphery of the rotor, which is opposed to an inner periphery of the housing, is slanted to the axial direction of the rotor.

With the arrangement mentioned above, even if the rotor moves radially to the housing so as to come into contact with the inner periphery of the housing, a force in the moving direction can be released in the slanted direction of the outer periphery of the rotor.

In the present invention, preferably, the inner periphery of the housing is shaped to have a convex curved-face.

Alternatively, preferably, the inner periphery of the housing is slanted in the same direction as the outer periphery of the rotor.

These and other objects and features of the present invention will become more fully apparent from the following description and appended claims taken in conjunction with the accompanying drawings.

DESCRIPTION OF THE PREFERRED EMBODIMENT

One embodiment of the present invention is now described with reference to the drawings.

Figure 1:
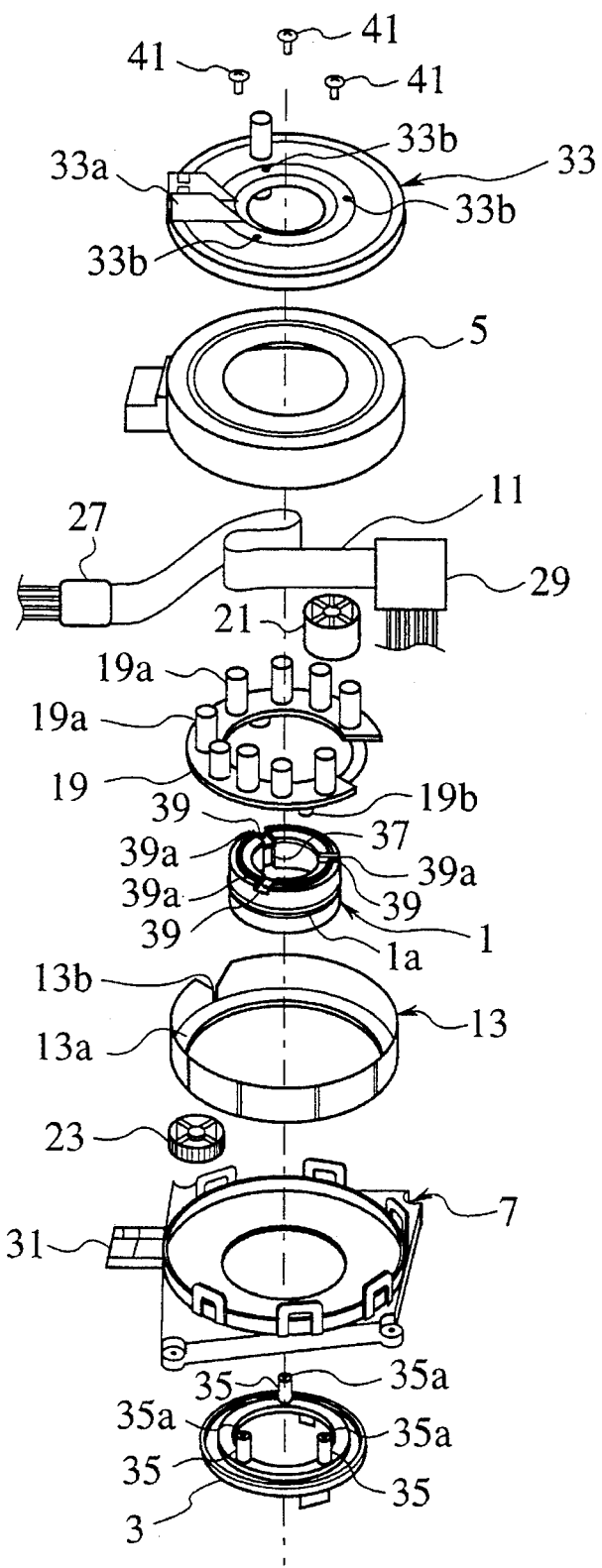
FIG. 1 is a perspective view showing a disassembled electrical connection device in accordance with an embodiment of the present invention.
Figure 2:
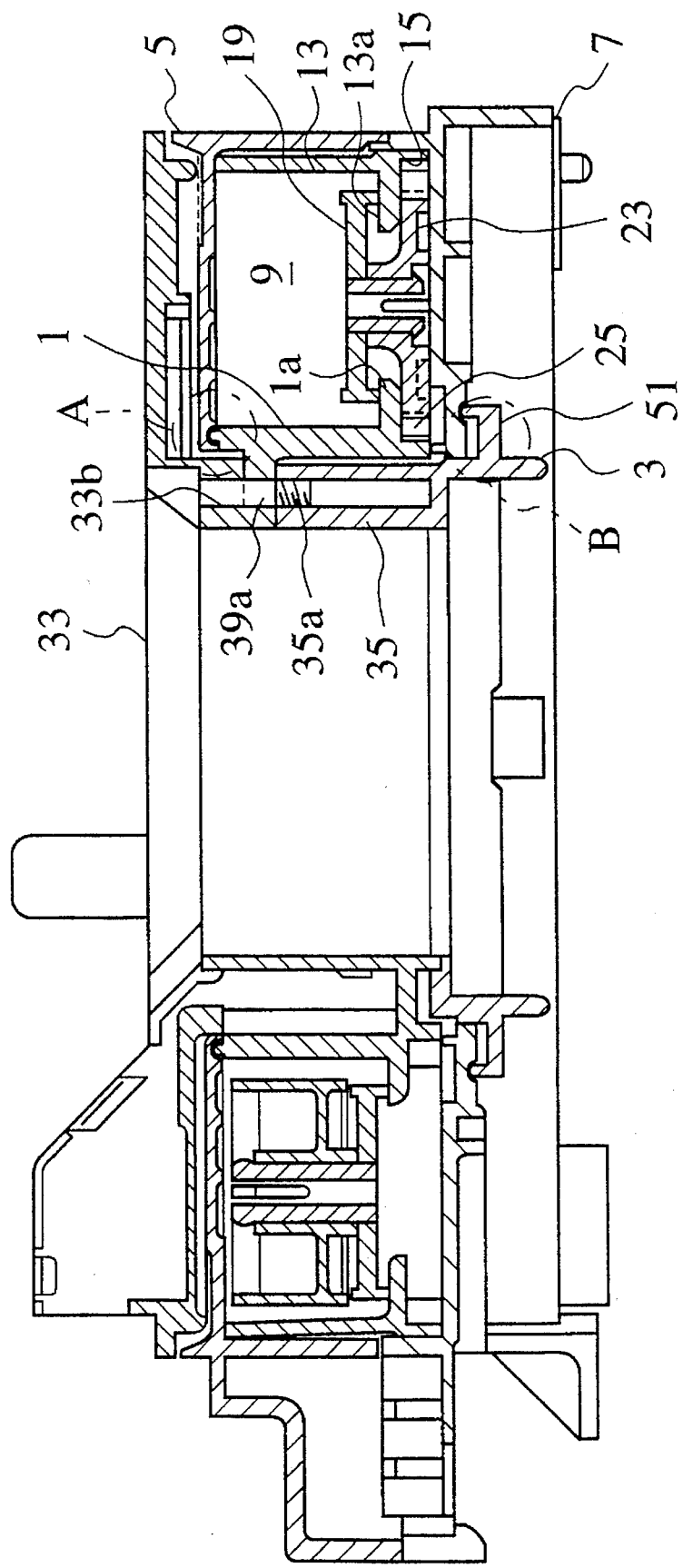
FIG. 2 is a cross-sectional view of the electrical connection device of FIG. 1 under the assembled condition.

FIG. 1 is a perspective view showing a disassembled electrical connection device in accordance with an embodiment of the present invention and FIG. 2 is a cross-sectional view thereof in its assembled condition.

The electrical connection device includes a cylinderical rotor to which a not-shown handle axle of the automobile is fixed. The cylindrical rotor consists of a first rotor element 1 and a second rotor element 3. The device further includes a cylindrical housing secured to a not-shown steering column to rotatably support the rotor at its outer periphery. The cylindrical housing consists of an upper cover 5 and an undercover 7 which is to be assembled with the upper cover 5.

Accommodated in the annular space 9 between the rotor and the cylindrical housing is a flexible flat cable (FFC) 11 which serves to connect the handle with the steering column electrically.

Secured in the cylindrical housing defined by the upper cover 5 and the undercover 7 is an internal gear 13 in which the FFC 11 is accommodated. The internal gear 13 is provided on a lower inner surface thereof with a gear section 15. A carrier 19 is rotatably mounted in the space 9 between a lower flange 13a of the internal gear 13 and a lower flange 1a of the first rotor element 1. The carrier 19 has a plurality of pins 19a which project upward and on which a plurality of guide rollers 21 for guiding the FFC 11 are rotatably mounted. On the other hand, rotatably mounted on three pins 19 projecting downward of the carrier 19 are respective planet gears 23 which mesh with the gear section 15 of the internal gear 13. The planet gears 23 also mesh with a gear section 25 formed on the lower and outer periphery of the first rotor element 1. Therefore, by the rotation of the planet gears 23 caused by a rotation of the first rotor element 1, the carrier 19 rotates with respect to the first rotor element 1 due to a revolution of the planet gears 23 in a predetermined reduction ratio.

Figure 3:
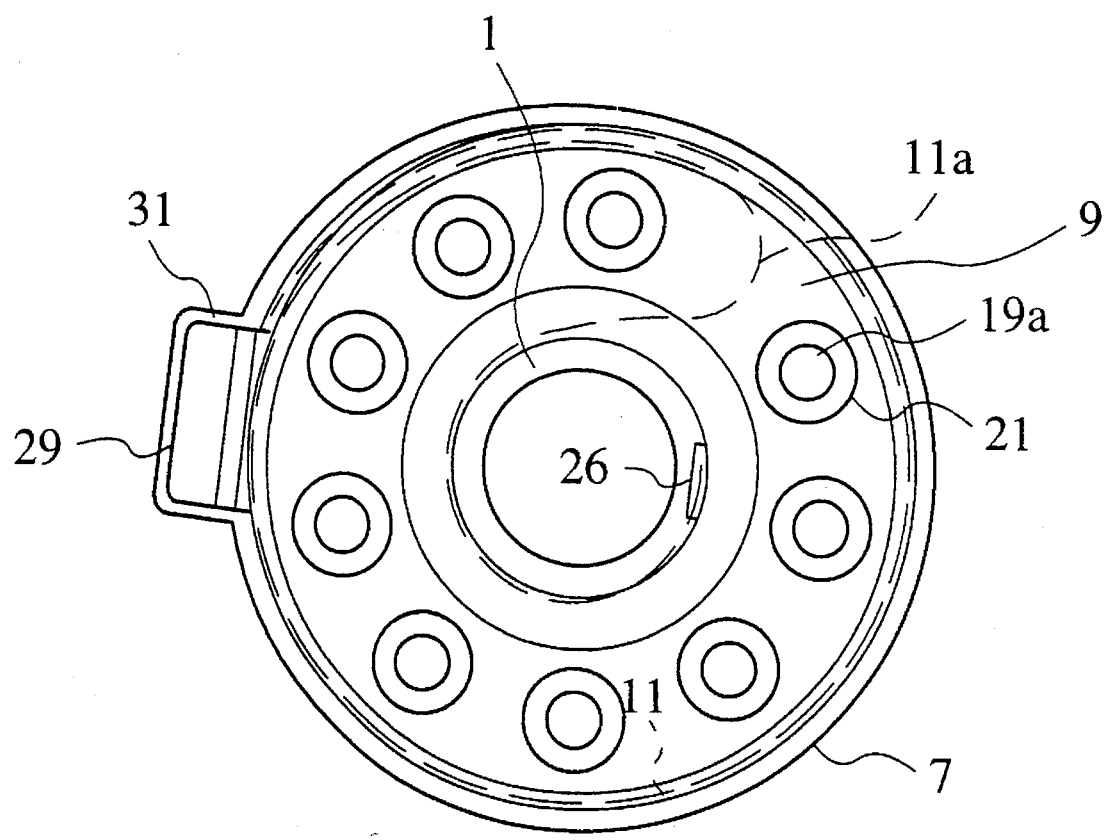
FIG. 3 is a plan view of FIG. 2 showing a flexible flat cable accommodated in a housing of the electrical connection device.

FIG. 3 is a plan view of the undercover 7 showing the FFC 11 with a broken line, which is accommodated in the housing. As shown in the figure, the FFC 11 has an terminal on its inner-periphery side, which is fixed to a fixed part 26 of the first rotor element 1 and to which a connector 27 is attached. After being wound on the outer periphery of the first rotor element 1, the FCC 11 extending from the connector 27 optionally passes about one of the guide rollers 21 thereby forming a curved section 11a. Thereafter, the FCC 11 is wound on the inner periphery of the internal gear 13 in an opposite direction of the above direction on the outer periphery of the first rotor element 1. Thus, the FCC 11 is pulled out of the internal gear 11 through a notch 13b, so that the connector 29 attached to a terminal of the FCC 11 is fixed to a swelling part 31 of the undercover 7.

On the upper cover 5, a rotating cover 33 is overlaid to rotate together with the first and second rotor elements 1 and 3, so that the connector 27 is fixed to a fixed section 33a provided on the rotating cover 33. The cover 33 has three holes 33b formed thereon and correspondingly, the second rotor element 3 is provided on an upper surface thereof with three bosses 35 to be respectively aligned with the holes 33b. Each boss 35 has a tapped hole 35a formed at its top end. In assembling, the respective bosses 35 are inserted into grooves 37 passing through the first rotor element 1 and brought into contact with an under surface of a flange part 39 of the first rotor element 1. The flange part 39 is provided with three through-holes 39a. Upon inserting three screws 41 into the holes 33b of the rotating cover 33 and the through-holes 39a of the first rotor element 1, the rotor are fixed to the housing by screwing the screws 41 into the tapped holes 35a of the second rotor element 3.

The FFC 11 has a length long enough to follow several rotation of the handle. Therefore, when the first rotor element 1 is rotated in the clockwise direction of FIG. 3, a section of the FFC 11 wound round the rotor element 1 is loosen and then wound about the inner periphery of the internal gear 13. On the contrary, when the first rotor element 1 is rotated in the counter-clockwise direction of FIG. 3, a section of the FFC 11 wound about the inner periphery of the internal gear 13 is loosen and then wound round the outer periphery of the first rotor element 1. During the above rotations of the rotor element 1, the FCC 11 can move smoothly at the same speed as that of the carrier 19 under a reduced frictional resistance due to the guide rollers 21 which are arranged between the rotor 1 and the internal gear 13 to rotate in contact with the FCC 11.

Figure 4:
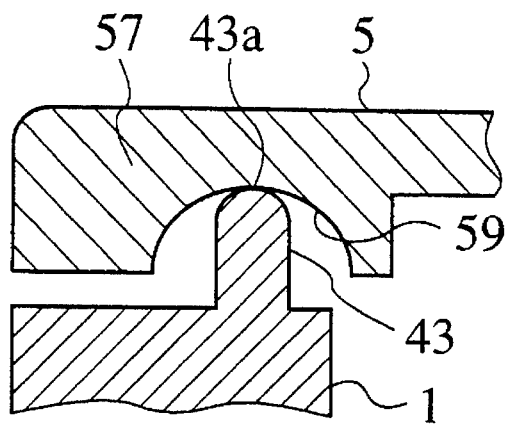
FIG. 4 is an enlarged cross-sectional view of a part A of FIG. 2, showing a contact of a first rotor element with an upper cover of the electrical connection device of the present invention.

In such an assembled state as shown in FIG. 2, an axial upper end of the first rotor element 1 comes into contact with the inner surface of the upper cover 5. FIG. 4 is an enlarged cross-sectional view showing a contact of the first rotor element 1 with the upper cover 5.

In FIG. 4, according to the embodiment, the first rotor element 1 has a projection 43 of which tip 43a is formed so as to have a convex curved-face. On the other hand, the upper cover 5 has a boss section 57 provided at an area opposing the tip 43a. The boss section 57 is provided on an inner surface thereof with a concave section 59 which is formed with a curvature larger than a curvature of the curved-face of the tip 43a.

Figure 5:
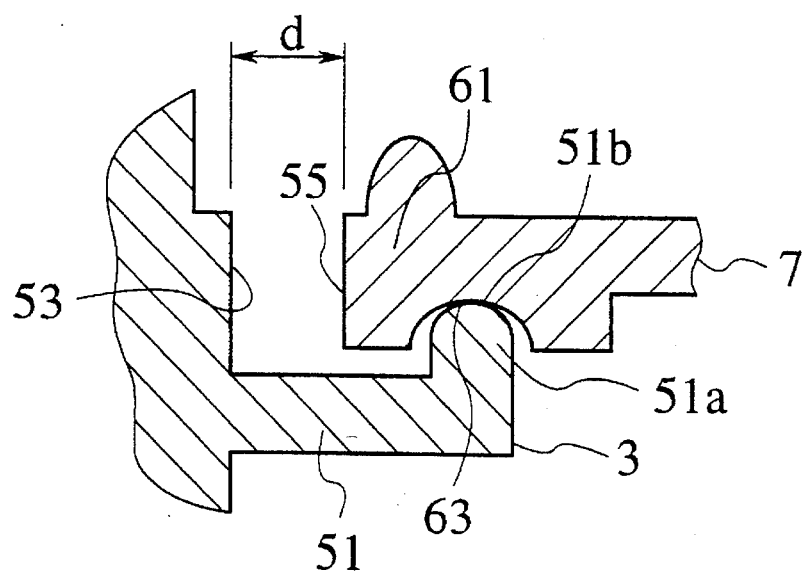
FIG. 5 is an enlarged cross-sectional view of a part B of FIG. 2, showing a contact of a second rotor element with an undercover of the electrical connection device of the present invention.

FIG. 5 is an enlarged cross-sectional view showing a contact of the second rotor element 3 with the undercover 7. In the embodiment shown in the figure, a clearance d between an outer periphery 53 of the second rotor element 3 and an inner periphery 55 of the undercover 7 is established to be considerably larger than that in the conventional device. In addition, the second rotor element 3 has a projection 51a of which tip 51b is formed so as to have a convex curved-face, as similar to the projection 43 of the first rotor element 1. Opposing to the tip 51b of the second rotor element 3, the undercover 7 has a boss section 61 which is provided on an inner surface thereof with a concave section 63. The concave section 63 has a curvature larger than a curvature of the curved-face of the tip 51b.

The electrical connection device mentioned above operates as follows.

With the revolution of the handle, the first and second rotor elements 1 and 3 rotate in the clockwise and counter-clockwise directions. Particularly, in reversing the rotating direction, the rotors is subject to a force for moving them radially with respect to the housing consisting off the upper cover 5 and the undercover 7. Then, although the tip 43a of the projection 43 of the first rotor element 1 slides on the concave section 59 so that a center of the projection 43 is deviated from a center of the section 59, the projection 43 is also subject to a force for returning it to the center of the section 59 due to mutual curved contact surfaces, whereby the first rotor element 1 is returned to such a position as shown in FIG. 4 quickly. Consequently, it is possible to prevent the projection 43 from engaging with the upper cover 5 with planes, whereby an occurrence of noise can be excluded at this area.

On the other hand, the tip 51b of the projection 51a of the second rotor element 3 slides on the concave section 63 of the undercover 7, so that a center of the projection 51a is deviated from a center of the section 63. However, the projection 51a is quickly returned to the center of the section 59 for the same reason as above. As mentioned above, since the clearance d between the outer periphery 53 and the inner periphery 55 is considerably larger than that in the conventional device and furthermore, since a difference in curvature between the concave section 63 and the tip 51b is not so much, an area of the concave section 63 where the projection 51a can slide would be small. Therefore, it is possible to prevent the inner periphery 55 of the undercover 7 from engaging with the outer periphery 53 of the second rotor element 3 with planes, whereby an occurrence of noise can be excluded at this area and the reliability of the whole device can be improved.

In addition to the above-mentioned largeness of the clearance d, since the curvature of the concave section 59 of the upper cover 5 is considerably large in comparison with that of the tip 43a of the projection 43 of the first rotor element 1, the rotor can be easily assembled with the housing in spite of the above-mentioned noise-reduction structure.

Figure 6:
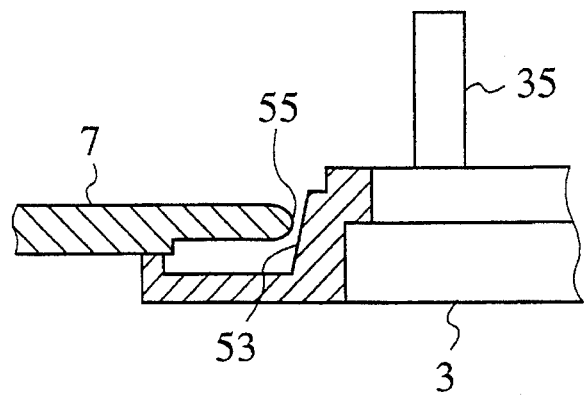
FIG. 6 is a cross-sectional view showing a contact of the second rotor element with the undercover of the electrical connection device in accordance with another embodiment of the present invention.

In connection with the structure shown in FIG. 5, FIG. 6 shows another embodiment of the invention. Note, in this embodiment, elements similar to those in the first embodiment are indicated by the same reference numerals.

Figure 7:
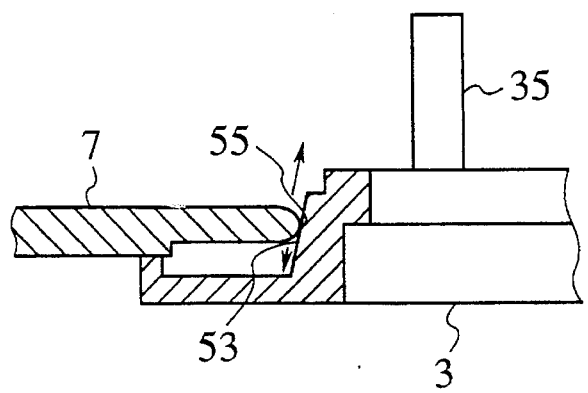
FIG. 7 is an explanatory cross-sectional view showing an operation of the electrical connection device of FIG. 6.

In the embodiment, the inner periphery 55 of the undercover 7 is shaped to have a convex cross-section while the outer periphery 55 of the second rotor element 3 is slanted so that an upper side thereof is decreased in diameter. With the arrangement, when the second rotor element 3, together with the first rotor element 1, is displaced radially with respect to the undercover 7 whereby the outer periphery 53 comes into contact with the inner periphery 55 as shown in FIG. 7, a force in the displacing direction can be released in both directions shown with arrows along the slanted surface thereby to reduce the noise at contact.

Figure 8:
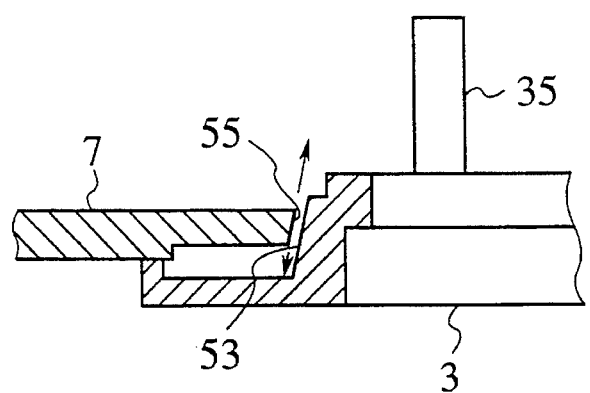
FIG. 8 is an explanatory cross-sectional view showing an operation of the electrical connection device in a modification of the embodiment of FIG. 7.

FIG. 8 shows a modification of the embodiment of FIG. 6, in which the inner periphery 55 of the undercover 7 is slanted corresponding to the outer periphery 58 of the second rotor element 3. Also in this embodiment, a force derived from a contact of the inner periphery 55 with the periphery 53, which is caused by the radial movement of the second rotor element 3, can be released in the same direction as those of FIG. 7, so that the contact-noise can be reduced.

Additionally, in common with the embodiment of FIGS. 6 and 8, since the upper side of the second rotor element 3 has a decreased diameter in comparison with that of the lower side thereof, the assembly task in assembling the rotor element 3 into the undercover 7 can be facilitated.

Finally, it will be understood by those skilled in the art that the forgoing description of the preferred embodiments of the disclosed structure, and that various changes and modifications may be made to the present invention without departing from the spirit and scope thereof.

What is claimed is:

1. An electrical connection device between a handle having an axle and a steering column for a vehicle, said device comprising:

a rotor into which the handle axle is fixed, said rotor having an annular projection with an axially facing radially convex surface;

a housing fixed to the steering column to rotatably support said rotor, said housing and said rotor defining an annular space, said housing having an annular recess with a radially concave surface for engaging the axially facing convex surface of said rotor; and a flexible flat cable accommodated in the annular space and of a length to accommodate clockwise and counterclockwise rotations of said rotor, said flexible flat cable having one end connected to said housing and another end connected to said rotor thereby to electrically connect said housing with said rotor.

2. An electrical connection device as claimed in claim 1, wherein said rotor comprises a first rotor element to which said another end of said flat cable is connected, and a second rotor element having an axial end engaged with a side of the first rotor element from outside of said housing and having another axial end exposed outside of said housing.

3. An electrical connection device as claimed in claim 2, wherein, on a side opposite from the side engaged with the second rotor element, the first rotor element has an annular projection with an axially facing convex surface opposed to an interior wall of said housing, the interior wall of said housing having an annular recess with a radially concave surface for engaging the axially facing convex surface of the first rotor element.

4. An electrical connection device as claimed in claim 2, wherein the exposed axial end of the second rotor element having an annular projection with an axially facing radially convex surface facing toward said housing, and wherein a part of said housing has an annular recess with a radially concave surface for engaging the axially facing surface of the second rotor element.

5. An electrical connection device as claimed in claim 4, wherein, on a side opposite from the side engaged with the second rotor element, the first rotor element has an annular projection with an axially facing radially convex surface opposed to an interior wall of said housing, the interior wall of said housing having an annular recess with a radially concave surface for engaging the axially facing convex surface.

6. An electrical connection device between a handle having an axle and a steering column for a vehicle, said device comprising:

a rotor into which the handle axle is fixed, said rotor having an outer periphery inclined in the axial direction of the rotor;

a housing fixed to the steering column to rotatably support said rotor, said housing and said rotor defining an annular space, said housing having an inner periphery opposed to the outer periphery of said rotor, the inner periphery having one of a radially concave surface and a surface inclined in the same direction as the outer periphery of said rotor; and a flexible flat cable accommodated in the annular space and of a length to accommodate clockwise and counterclockwise rotations of said rotor, said flexible flat cable having one end connected to said housing and another end connected to said rotor thereby to electrically connect said housing with said rotor.

\* \* \* \* \*